US011070315B2

(12) United States Patent
Jayasinghe et al.

(10) Patent No.: US 11,070,315 B2
(45) Date of Patent: Jul. 20, 2021

(54) ERROR DETECTION AND CHANNEL CODING OF TRANSPORT BLOCKS

(71) Applicant: Nokia Technologies Oy, Espoo (FI)

(72) Inventors: Keeth Saliya Jayasinghe, Piliyandala (LK); Yi Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 191 days.

(21) Appl. No.: 16/336,498

(22) PCT Filed: Sep. 26, 2016

(86) PCT No.: PCT/CN2016/100171
§ 371 (c)(1),
(2) Date: Mar. 26, 2019

(87) PCT Pub. No.: WO2018/053854
PCT Pub. Date: Mar. 29, 2018

(65) Prior Publication Data
US 2020/0295873 A1    Sep. 17, 2020

(51) Int. Cl.
*H04L 1/00* (2006.01)
*H04L 1/16* (2006.01)
*H04L 1/18* (2006.01)

(52) U.S. Cl.
CPC .......... *H04L 1/0061* (2013.01); *H04L 1/0009* (2013.01); *H04L 1/0047* (2013.01);
(Continued)

(58) Field of Classification Search
CPC ... H04L 1/0061; H04L 1/0009; H04L 1/0047; H04L 1/0057; H04L 1/0073; H04L 1/1614; H04L 1/1809

(Continued)

(56) References Cited

U.S. PATENT DOCUMENTS 7,415,656 B2 * 8/2008 Matusz ................ H04L 1/0083
714/758
7,793,194 B2 * 9/2010 Seo ....................... H04L 1/0061
714/776

(Continued)

FOREIGN PATENT DOCUMENTS

CN    105530071 A    4/2016
CN    105530072 A    4/2016

(Continued)

OTHER PUBLICATIONS

Jun. 19, 2017, International Search Report of Application No. PCT/CN2016/100171.

*Primary Examiner* — Albert Decady
*Assistant Examiner* — Enam Ahmed
(74) *Attorney, Agent, or Firm* — Harrington & Smith

(57) ABSTRACT

This document discloses a solution for error detection. According to an aspect, a method comprises: generating, by a first apparatus, a transport block and error detection bits for the transport block; generating, by the first apparatus, a first number of code block groups by using the transport block and the error detection bits, wherein the first number is two or higher and based on a number of code blocks a second apparatus is able to decode in parallel processing; generating, by the first apparatus, error detection bits for at least one of the code block groups; generating, by the first apparatus, a plurality of code blocks for each code block group, and causing transmission of the plurality of code blocks to the second apparatus.

20 Claims, 7 Drawing Sheets

(52) U.S. Cl.
CPC .......... *H04L 1/0057* (2013.01); *H04L 1/0073* (2013.01); *H04L 1/1614* (2013.01); *H04L 1/1809* (2013.01)

(58) Field of Classification Search
USPC ........................................................ 714/776
See application file for complete search history.

(56) References Cited

U.S. PATENT DOCUMENTS

| | | | |
|---|---|---|---|
| 8,694,871 B2 * | 4/2014 | Miyazaki | H03M 13/1105 |
| | | | 714/776 |
| 2016/0014637 A1 | 1/2016 | Kim et al. | |
| 2016/0173130 A1 * | 6/2016 | Krysl | H04L 1/0057 |
| | | | 714/776 |
| 2016/0197625 A1 * | 7/2016 | Shinohara | H03M 13/2778 |
| | | | 714/776 |
| 2019/0053230 A1 * | 2/2019 | Andersson | H04L 1/1822 |

FOREIGN PATENT DOCUMENTS

| | | | |
|---|---|---|---|
| EP | 1971096 A2 | 9/2008 | |
| WO | WO-2016/126330 A1 | 8/2016 | |

* cited by examiner

ERROR DETECTION AND CHANNEL CODING OF TRANSPORT BLOCKS

FIELD

The invention relates to a solution for forming code blocks in a source device and for performing error detection in a sink device employing a code-block-based channel coding scheme.

BACKGROUND

Some channel coding schemes employ block-coding where a code block of determined length is formed from systematic bits and parity bits. Systematic bits represent data to be transferred over a channel, and the parity bits contain redundant information that is used to facilitate decoding of the systematic bits in a decoder. Low-Density Parity Check (LDPC) codes have been used in block-coding in wireless systems. LDPC codes as such are well known in coding theory and known to approach the Shannon channel capacity limit when utilized properly in data transmission. Irregular LDPC codes are known from the fact that input bits may be encoded with different degrees of coding strength, i.e. each input bit may be protected by a different number of parity check equations. Regular LDPC codes employ the same number of parity check equations for each systematic bit.

An LDPC code can be represented by a bipartite graph, which consists of variable nodes, check nodes and a certain number of edges between these two types of node. Each variable node represents a bit of a codeword and each check nodes represents a parity check of the code. An edge exist between a variable node and a check node only if this bit is checked by this edge-connected parity check equation. The degree of a node is the number of edges connected to this node. An irregular LDPC code has a bipartite graph in which the bit nodes (check nodes) have different degrees. A higher variable node degree means that a bit is protected by more parity check equations, which implies to a lower bit error probability. In this manner, a parity check matrix may be constructed. The parity check matrix defines how parity check bits should be calculated. That is, each parity check bit is calculated from given one or more systematic data bits and parity bits.

Quasi-cyclic LDPC (QC-LDPC) codes have been designed to provide efficient implementations. In a quasi-cyclic implementation, the parity check matrix is constructed by a plurality of sub-matrices, wherein at least some of the sub-matrices are circulant permutation matrices. Some of the other sub-matrices may have another constructions, e.g. a zero matrix construction.

The LDPC codes form an efficient solution for forward error correction. After the decoding, the success of decoding the codeword may be verified by using a cyclic redundancy check (CRC), and the result of the CRC check indicates whether or not the decoded codeword includes residual, post-decoding errors. With coding schemes other than the LDPC, a similar post-decoding error detection procedure may be employed.

BRIEF DESCRIPTION OF THE INVENTION

The invention is defined by the subject-matter of the independent claims. Embodiments are defined in the dependent claims.

LIST OF DRAWINGS

In the following, the invention will be described in greater detail with reference to the embodiments and the accompanying drawings, in which FIG. 1 illustrates some wireless communication scenarios to which embodiments of the invention may be applied;

DESCRIPTION OF EMBODIMENTS

Figure 1:
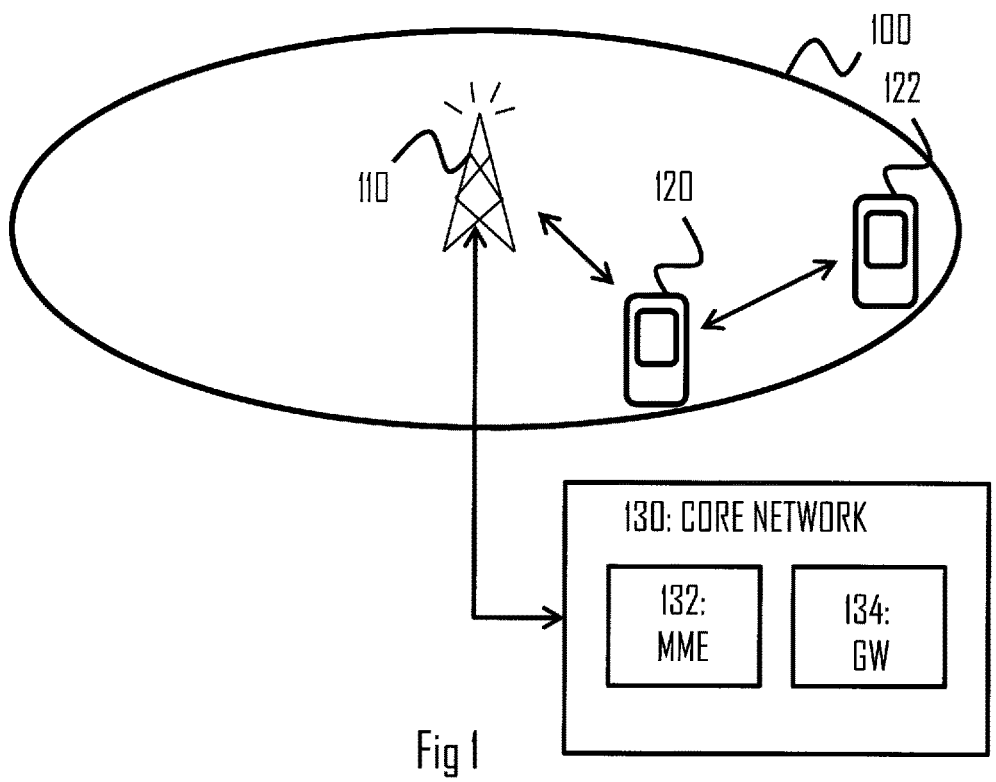

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system.

The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communication system to which some embodiments of the invention may be applied. The system may comprise one or more access nodes 110 providing and managing respective cells 100. The cell 100 may be, e.g., a macro cell, a micro cell, femto, or a pico cell, for example. From another point of view, the cell may define a coverage area or a service area of the access node. The access node 110 may be an evolved Node B (eNB) as in the LTE and LTE-A, an access point of an IEEE 802.11-based network (Wi-Fi or wireless local area network, WLAN), or any other apparatus capable of controlling radio communication and managing radio resources within a cell. The access node may provide radio connection to a wireless terminal device need for any intermediate device. In other embodiments, there may be relaying node(s) between the access node and the wireless terminal device. For 5G solutions, the implementation may be similar to LTE-A, as described above. The access node may be called a base station or a network node. The system may be a wireless communication system composed of a radio access network of access nodes, each controlling a respective cell or cells. The access nodes may provide terminal devices (UEs) 120 with wireless access to other networks such as the Internet. In some scenarios, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within the macro cell. The operation of the local area access node may be controlled by an access node under whose control area the sub-cell is provided. In some scenarios, a plurality of local area access nodes may be controlled by a single macro cell access node.

In the case of multiple access nodes in the communication network, the access nodes may be connected to each other with an interface. LTE specifications call such an interface as X2 interface. In IEEE 802.11 networks, a similar interface may be provided between access points. Other wired or wireless communication methods between the access nodes may also be possible. The access nodes may be further connected via another interface to a core network 130 of the cellular communication system. The LTE specifications specify the core network as an evolved packet core (EPC), and the core network may comprise a mobility management entity (MME) 132 and a gateway (GW) node 134. The MME may handle mobility of terminal devices in a tracking area encompassing a plurality of cells and also handle signalling connections between the terminal devices and the core network 130. The gateway node 134 may handle data routing in the core network 130 and to/from the terminal devices. In some scenarios, the different access nodes may be connected to different core networks. The different core networks may be operated by the same operator or by different operators.

The radio system of FIG. 1 may support Machine Type Communication (MTC). MTC may enable providing service for a large amount of MTC capable devices, such as the at least one terminal device 120. The at least one terminal device 120 may comprise a mobile phone, smart phone, tablet computer, laptop or other devices used for user communication with the radio communication network, such as an MTC network. These devices may provide further functionality compared to the MTC scheme, such as communication link for voice, video and/or data transfer. However, in MTC perspective the at least one terminal device 120 may be understood as a MTC device. It needs to be understood that the at least one terminal device 120 may also comprise another MTC capable device, such as a sensor device providing position, acceleration and/or temperature information to name a few examples. Some embodiments of the invention may thus be applicable to Internet of Things (IoT) systems, e.g. a radio access technology supporting a narrowband IoT (NB-IoT) communication scheme.

FIG. 1 illustrates an infrastructure-based communication scenario with a fixed access node 110 providing a mobile terminal device 120 with radio access. Another perspective in wireless communications involves wireless links between mobile devices 120, 122. The devices 120, 122 may be peer devices in the sense that the devices 120, 122 may be the end points of the connection. In another scheme, one of the devices 120 may provide the other device 120 with wireless access to the infrastructure. Accordingly, the device providing the access may be understood as a mobile access node. Such a scheme is sometimes called tethering. In yet another scheme, the mobile devices 120, 122 may form a mobile ad hoc network having no fixed infrastructure and not necessarily an access node at all. In general, the embodiments of the invention described below are applicable to any system that employs channel coding to compensate for error caused by a communication channel such as a radio channel.

Channel encoding is commonly in wireless communication links to combat signal degradation in a radio channel. The channel encoding is typically based on processing data bits in a channel encoder and outputting encoded data bits to further processing in a radio transmitter. The channel encoder typically outputs bits at a higher data rate than a data rate at its input. In other words, the channel encoder computes additional information from the data bits. A systematic channel coding scheme maintains the original data bits at its output and, additionally, outputs parity bits that may be used as additional information in a channel decoder. The low-density parity check (LDPC) codes described in the Background section are an example of such channel codes. Embodiments of the invention described in this document may employ the LDPC codes. However, the embodiments may be applicable to other block codes in a straightforward manner. After decoding a code block in the receiver, an error detection procedure may be executed, wherein the decoded code block is scanned for remaining erroneous bits. Cyclic redundancy check (CRC) bits or other error detection bits may be added to the code block to enable the error detection. If the decoded code block is detected to contain errors in the error detection procedure, the decoding may be deemed unsuccessful. If the decoded code block is detected to contain no errors in the error detection procedure, the decoding may be deemed successful.

In many wireless links, an automatic repeat request (ARQ) scheme is also used for retransmissions related to data not being successfully decoded in a receiver. The ARQ scheme is based on the receiver acknowledging (ACK) successful decoding of the data to the transmitter. Some systems employ also negative acknowledgments (NACK/NAK) for the receiver to indicate the failed decoding of the data. Other systems do not employ the NACK/NAK. In such systems, upon not receiving the ACK within a determined time window from the transmission, the transmitter carries out a retransmission.

In a conventional system, a transport block of a determined length (in terms of a number of bits) is divided into a plurality of code blocks, and each of the code blocks is provided with a CRC part comprising a determined number of CRC bits, e.g. 24 CRC bits in the LTE system. A function of the CRC bits is to enable early detection of an erroneous transport block such that a retransmission of the transport block may be triggered without decoding all the code blocks. Modern receivers are capable of parallel decoding of the code blocks which reduces the advantage of using the CRC for every code block. Instead, such a CRC per code block causes overhead. Depending on the code block size and, accordingly, the number of code blocks per transport block, the number of CRC bits may consume a significant portion of the resources.

Figure 2:
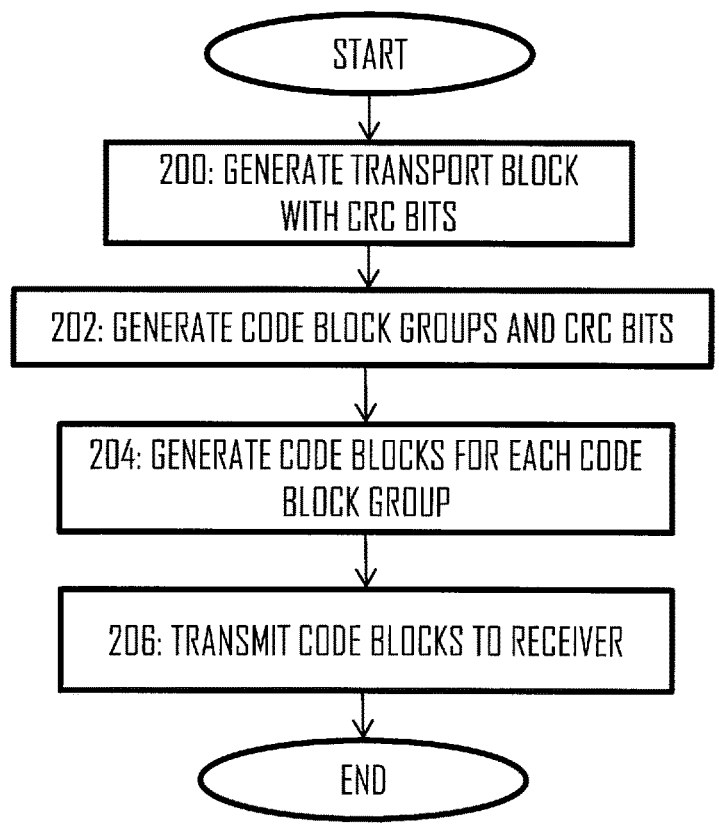
FIGS. 2 and 3 illustrate flow diagrams of processes for employing error detection on code block group level according to some embodiments of the invention.
Figure 3:
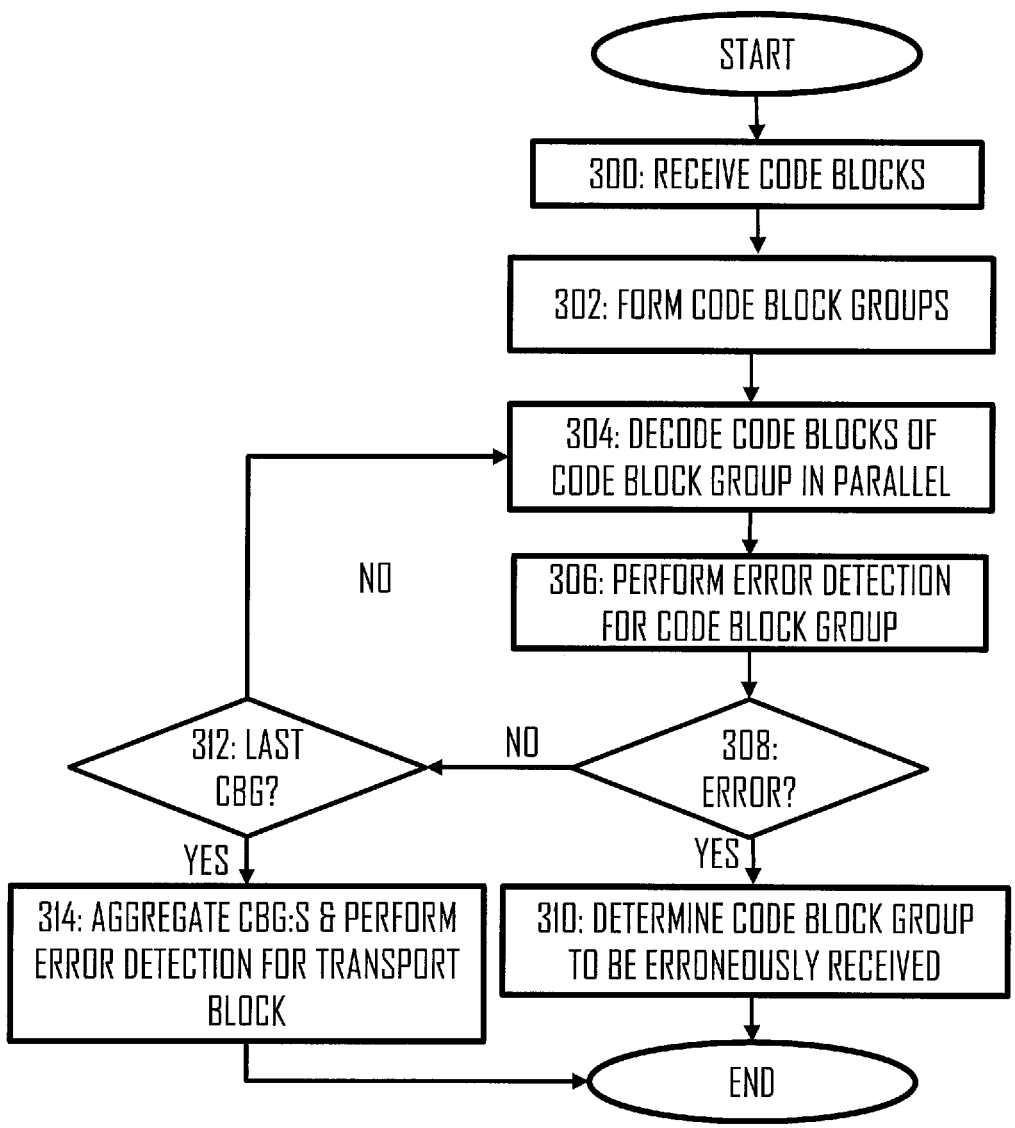

Some embodiments of the present invention employ a block-coding scheme and error detection where this overhead is reduced. FIGS. 2 and 3 illustrate some embodiments of processes for a source device and a sink device of a transport block, respectively. The source device may refer to a transmitter or an originator of the transport block, while the sink device may refer to a receiver of the transport block. Referring to FIG. 2, a process comprises as performed by an apparatus suitable for the source device: generating a transport block and error detection bits for the transport block (block 200); generating a first number of code block groups by using the transport block and the error detection bits (block 202), wherein the first number is two or higher and based on a number of code blocks that another apparatus (the sink device) is able to decode in parallel processing; generating error detection bits for at least one of the code block groups (block 202); generating a plurality of code blocks for each code block group (block 204); and causing transmission of the plurality of code blocks to the other apparatus (block 206).

Referring to FIG. 3, a process comprises as performed by an apparatus suitable for the sink device: receiving, another apparatus (the source device), a plurality of code blocks of a transport block (block 300); forming a first number of code block groups by using the plurality of code blocks (block 302), wherein the first number is two or higher and based on a number of code blocks the apparatus is able to decode in parallel processing; decoding code blocks of a code block group in said parallel processing (block 304); performing, after said decoding, error detection of the code block group by using error detection bits associated with code block group (block 306); upon detecting an error in the code block group in said error detection (YES in block 308), determining that the transport block contains errors after the decoding (block 310); upon detecting no errors in the code block group in said error detection (NO in block 308), performing said decoding and said performing the error detection for a subsequent code block group of the transport block (return to block 304 to process another code block group); upon detecting no error in the first number of code block groups in said error detecting (the process moves from block 312 to block 314 after processing the last code block group of the transport block), aggregating the code block groups into a transport block and performing error detection by using error detection bits associated with the transport block (block 314).

The embodiments of FIGS. 2 and 3 divide the transport block into a number of code block groups on the basis of parallel processing capabilities of the sink device, and include the error detection bits (e.g. CRC bits) per code block group instead of per code block of the conventional solution. This enables reduction in the number of CRC bits. It is also feasible in the sense that the error detection bits are arranged from the viewpoint of when the decoding process can be terminated upon detecting residual, post-decoding errors.

A code block may be associated with operation of the block encoder/decoder such that a code block represents a unit of channel code that is processed at a time by a block encoder/decoder. The code block may comprise the above-described systematic part and the parity bits formed on the basis of the systematic part.

Figure 4:
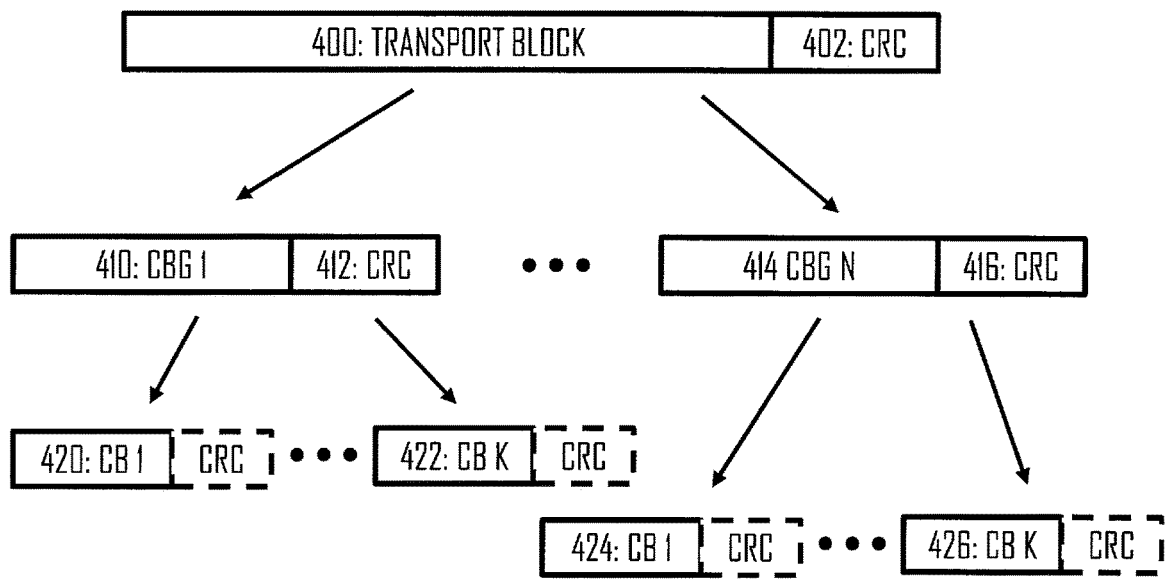
FIG. 4 illustrates division of a transport block into code block groups and further to code blocks according to an embodiment of the invention.

FIG. 4 illustrates the distribution of the transport block 400 into the code block groups and further to the code blocks. Let us assume as initial conditions that the transport block 400 is of a determined size in terms of number of bits and that the code block is of a determined size. The size of the transport block may depend on an amount of radio resources available to the source device, e.g. time-frequency resources scheduled by the access node. The size of the code block may depend on channel conditions between the source device and the sink device, e.g. signal-to-noise ratio (SNR) of a radio channel. A lower SNR or poorer channel conditions may require addition of more parity check bits, thus increasing the size of the code block.

Referring to FIG. 4, the transport block 400 may be provided with the error detection bits 402 added to a tail of the transport block 400. The transport block 400 together with the error detection bits 402 may be divided into the first number of code block groups (CBG) 1 to N, as illustrated in FIG. 4 by numbers 410, and 414. Each CBG 410, 414 may be provided with a separate set of error detection bits 412,

416. Each CBG 410, 414 together with associated error detection bits 412, 416 may then be divided into code blocks. As illustrated in FIG. 4, CBG 1 410 and error detection bits 412 are divided into K code blocks (CB) 420, 422, and CBG N 414 and error detection bits 416 are divided into K code blocks (CB) 424, 426. K refers to the number of parallel processing capability in the sink device, e.g. the number of code blocks the sink device can decode in the parallel processing. As K is fixed and the length of the code blocks 420, 424 are fixed, together with the length of the transport block, the number of code block groups depends on the value of K.

In an embodiment, the number of error detection bits in 412 and 416 is fixed, e.g. 24 bits. In another embodiment, the number of error detection bits in 412 and 416 is variable and can be selected according to a determined criterion. The criterion may include at least one of the following criteria: the number of CBGs formed of a transport block, the number of bits in a CBG, and the number of code blocks in a CBG.

In an embodiment, the error detection bits 412 are comprised in the last, Kth, code block. The last code block may also comprise other bits such as parity check bits and/or systematic data bits. The other code blocks 1 to K−1 may contain none of the error detection bits 412.

In an embodiment, the last CBG N is not dividable to K code blocks in a case where the smaller size of the remaining bits in the CBG N limits the division. Accordingly, the last CBG N may be divided into a number of code blocks smaller than K. The actual number of code blocks in the CBG N may be depend on the number of bits in the CBG N and the size of the code blocks used in the encoding/decoding.

In an embodiment, a further level of error detection may be applied to the code blocks by adding error detection bits to each code block (see dashed CRC in FIG. 4). Other embodiments omit the error detection on the code block level. For example, the LDPC codes incorporate inherent error detection feature by using the parity bits and, therefore, the additional error detection bits may be redundant. In other words, the sink device may determine during the decoding whether or not it can decode a code block without errors.

Figure 5A:
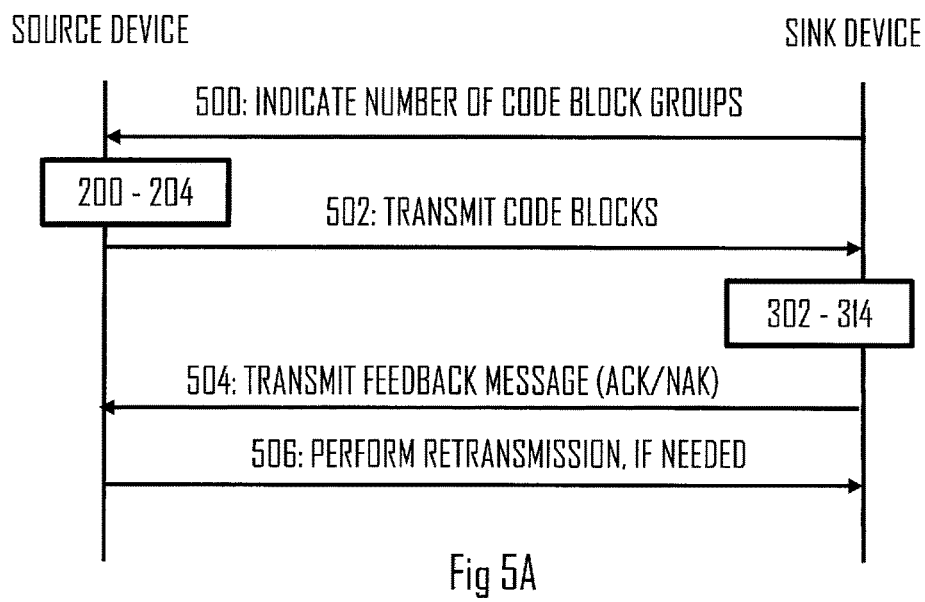
FIG. 5A illustrates a signaling diagram of generation and transfer of code blocks in a source device and error detection in a sink device according to an embodiment of invention.

Let us now consider the transfer of the transport block from the source device to the sink device with reference to FIG. 5A. The source device may be the access node 110, and the sink device may be the mobile device 120, or vice versa. With respect to peer-to-peer connections or other direct connections between mobile devices, the source device may be the mobile device 120 and the sink device may be the mobile device 122 (or vice versa). Referring to FIG. 5A, the sink device may indicate the value K to the source device in step 500. Step 500 may be carried out as a part of radio resource control (RRC) signalling between the source device and the sink device. Upon receiving the value K and, thus, gaining information on the number of code blocks per code block group, the source device is capable of forming the code block groups. Although the number of CBGs is dependent on K, the number of code block groups may be unequal to K. This may be understood from the viewpoint that the same size of a code block is used for at least most of the code blocks within the transport block, and the size of the transport block sets another boundary to the number of CBGs. By using these boundaries, the value of K induces a certain number of CBGs.

Thereafter, the source device may carry out the process of FIG. 2 (blocks 200 to 204) and transmit the code blocks 420 to 426 of the transport block 400 to the sink device in step 502. Upon receiving the code blocks in step 502, the sink device may start decoding the code blocks by carrying out blocks 302 to 314 of FIG. 3.

Referring to FIG. 4, the sink device may form the CBGs in block 302 from the received code blocks 420 to 426 by allocating code blocks of the same CBG to different parallel processing streams such that the code blocks of the same CBG are processed simultaneously in the parallel decoding processes in the sink device. For example, the code blocks 420 and 422 may be processed in parallel, and code blocks 424 and 426 may be processed in parallel. Code blocks 420 and 424 may, however, be arranged in a serial form and processed at different times. The parallel processing streams may each further comprise an error detection process where presence of residual, post-decoding errors is checked, e.g. by using the additional error detection bits illustrated in FIG. 4 for each code block. With the LDPC codes, the error detection may be integrated into the decoding process. If any one of the code blocks is detected to include one or more erroneous bits, the code block group or even the transport block 400 may be deemed to be erroneously received. As a result of such decision, the sink device may terminate the processing of any further code blocks of the transport block and initiate generation of a negative acknowledgment message (NAK) to the source device. The NAK is a feedback message indicating erroneous reception to the source device, and the NAK may be transmitted by the sink device to the source device in step 504. Upon receiving the NAK in step 504, the source device may carry out retransmission of the erroneously received information. The retransmission may include retransmission of the transport block 400, retransmission of the code block group, or retransmission of even a code block, depending on the embodiment. Embodiment of FIG. 6 illustrates multiple levels of the ARQ process.

Upon decoding the code blocks of a CBG, and in some embodiments upon successful error detection on the code block level, the sink device may aggregate the decoded code blocks into the CBG, e.g. decoded code blocks 420 and 422 to the CBG 1 410. Thereafter, the error detection may be carried out for the CBG by using the error detection bits 412. The error detection at this stage may be a CRC process. Upon detecting an error in the CBG, the sink device may terminate any or all further decoding of the transport block 400, remaining undecoded CBGs or code blocks, and/or the erroneous CBG and initiate generation of the NAK (steps 504 and 506 follow). If the process proceeds such that all the CBGs of the transport block 400 have been decoded and deemed to contain no residual errors, the sink device may aggregate the CBGs 410, 414 into the transport block 400 and the error detection bits 402 and perform an error detection process for the transport block by using the error detection bits 402. The error detection at this stage may be a CRC process. Upon detecting an error in the transport block, the sink device may initiate generation of the NAK (steps 504 and 506 follow). If no residual errors are detected in the transport block, the sink device may generate a positive acknowledgment message (ACK) and transmit the ACK to the source device to indicate successful reception of the transport block 400.

As described above, providing the CBGs with the error detection bits enables termination of the decoding process immediately upon detecting the post-decoding errors while reducing overhead caused by the error detection bits. Furthermore, providing the error detection bits on multiple layers enables ARQ process on the multiple layers, e.g. on a transport block layer and on a CBG layer. This further enables retransmission of an erroneous CBG without the need to retransmit the whole transport block 400. FIG. 6 illustrates such a procedure in greater detail.

Figure 5B:
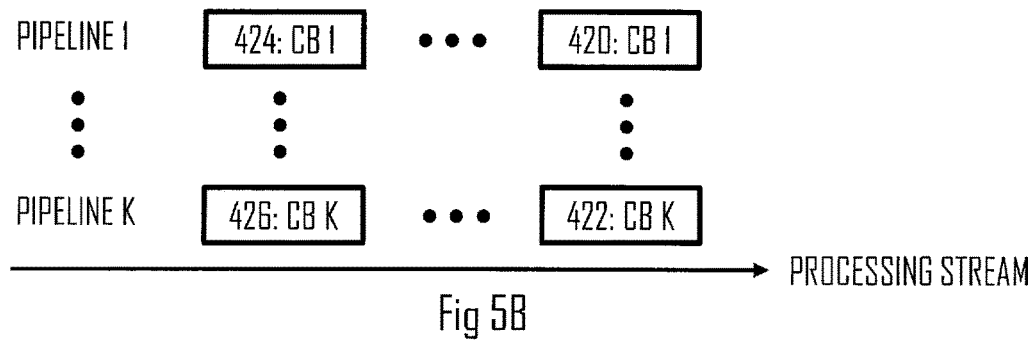
FIG. 5B illustrates parallel decoding in the sink device according to an embodiment of invention.
Figure 6:
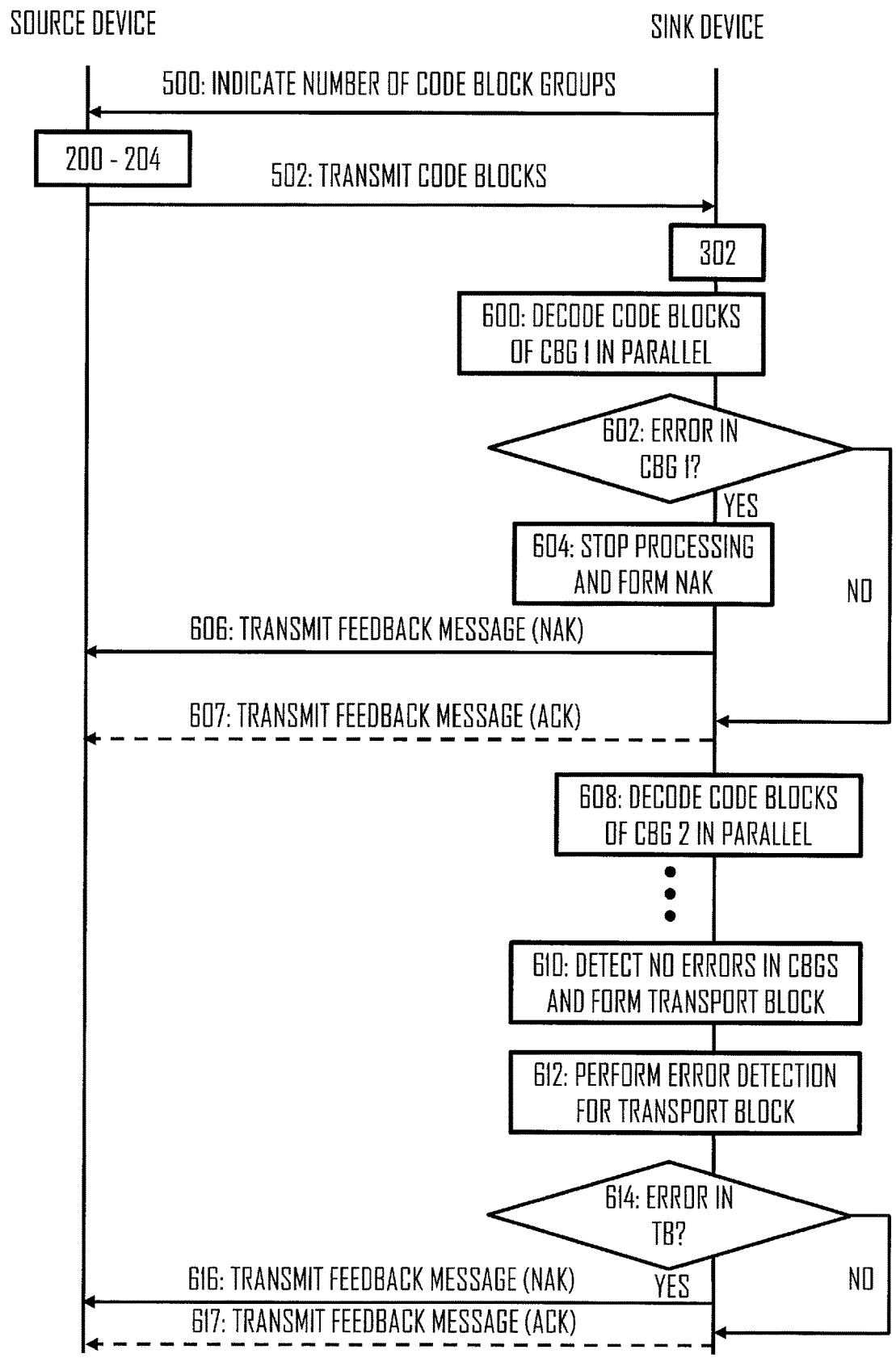
FIG. 6 illustrates an embodiment of the procedure of FIG. 5A in greater detail, comprising automatic repeat request processes on multiple levels according to an embodiment of invention.

Referring to FIG. 6, the process may proceed as illustrated above in with FIG. 5A until block 600. In block 600, the sink device may decode the code blocks of a first CBG in the parallel processing. FIG. 5B illustrates the parallel processing where the code blocks 1 to K of the same CBG are allocated to different processing pipelines 1 to K, respectively. Accordingly, a decoder of the sink device decodes the code blocks of the same CBG in parallel, e.g. the code blocks 420 to 422 of the first code block of the transport block 400 are processed in block 600 of FIG. 6. After the decoding, the decoded code blocks are aggregated into a decoded first code block group, and error detection for the decoded first code block group is performed in block 602 by using the error detection bits associated with the decoded first code block group. If no residual errors are detected in the first CBG, the process proceeds to decoding of the next CBG (CBG 2).

In an embodiment where the ARQ process is carried out on a CBG level, the detection of no residual errors in lock 602 may trigger transmission of a feedback message (ACK) in step 607 and processing of the subsequent second CBG in block 608. The feedback message may be transmitted between the processing of the CBGs, as illustrated in FIG. 6 but, in other embodiments, multiple CBG-level ACK/NAKs are bundled into a single feedback message transmitted after processing the transport block. Such a bundled feedback message may be transmitted at an end of a sub-frame comprising the transport block or even later.

Upon detecting residual errors in block 602, the process may proceed to block 604 where the processing is terminated. In an embodiment, block 604 comprises termination of the processing of further CBGs of the transport block. In an embodiment, block 604 comprises termination of the further processing of the transport block. In an embodiment, block 604 comprises termination of the processing of the first CBG. In an embodiment, upon detecting that a certain number of CBGs of the transport block contain errors, the sink device may terminate the processing of the further CBGs and assume that they also contain errors. This detection may trigger transmission of a NAK for the transport block.

In an embodiment where the detection of the residual errors in the first CBG leads to a decision that the whole transport block is received erroneously, block 604 may comprise termination of the further processing of the transport block and generation of a feedback message (NAK) for the transport block. The NAK may be transmitted from the sink device to the source device in step 606 to trigger retransmission of the whole transport block in the source device.

In an embodiment where the detection of the residual errors in the first CBG leads to a decision that the first CBG is received erroneously, block 604 may comprise termination of the further processing of the first CBG and generation of a feedback message (NAK) for the first CBG. The NAK may be transmitted from the sink device to the source device in step 606 to trigger retransmission of only the erroneously received first CBG in the source device without the need for retransmitting the whole transport block. In this embodiment, the process may then proceed to block 608 to process the subsequent CBG, i.e. a second CBG of the transport block. Block 608 may be carried out after transmitting the NAK but before receiving the retransmission of the first CBG. Block 608 may be carried out before transmitting the NAK, e.g. when multiple ACK/NAKs are bundled together and transmitted at an end of a sub-frame comprising the transport block 400. In such a case, the sink device may first decode all the CBGs and form ACK/NAKs for all the CBGs of the transport block and, then, transmit a single feedback message comprising ACK/NAKs for all the CBGs of the transport block.

The code blocks of the remaining CBGs of the transport block 400 may be processed in a similar manner as described in connection with steps 600 to 607. When all the CBGs of the transport block have been correctly received, possibly with one or more CBGs being retransmitted, and no residual errors are detected in the CBGs of the transport block, the CBGs may be aggregated to form the transport block (block 610), and the error detection for the transport block may be carried out in block 612 by using the error detection bits provided in connection with the transport block for this purpose. Upon detecting no residual errors in the transport block in block 614, the process may proceed to step 617 where the sink device transmits a positive feedback message ACK to the source device. The source device may then update its ARQ process with information that the transport block has been successfully delivered to the sink device. Upon detecting residual errors in the transport block in block 614, the process may proceed to step 617 where the sink device transmits a negative feedback message NAK to the source device, and the source device may then carry out a retransmission of the transport block to the sink device.

Figure 7:
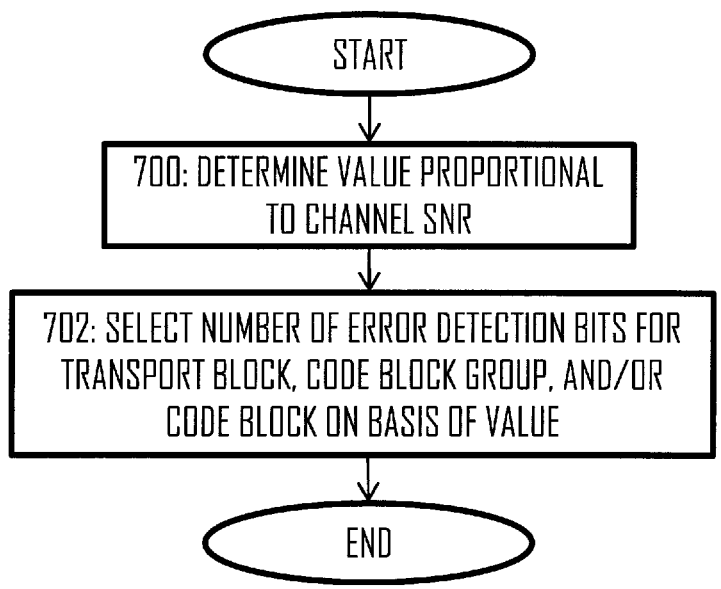
FIG. 7 illustrates a process for adapting the number of error detection bits to channel quality according to an embodiment of invention.
Figure 8:
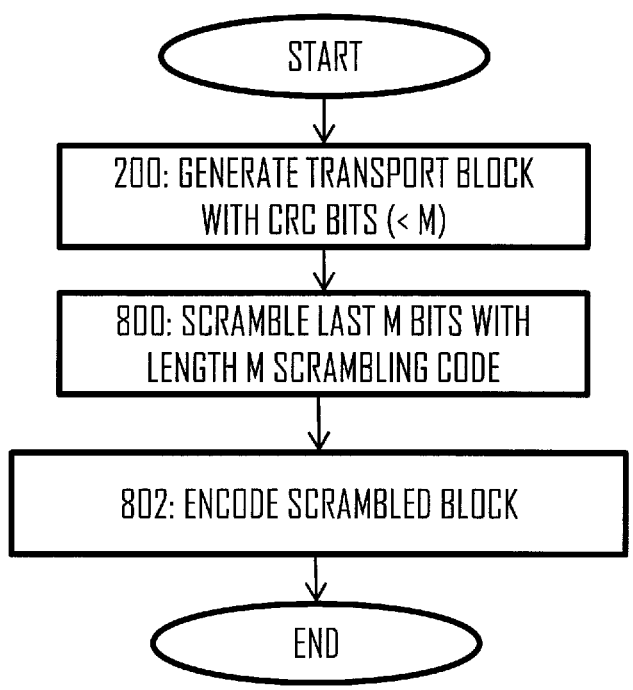
FIGS. 8 and 9 illustrate a process for using fixed-length scrambling code in connection with variable-length error detection bit part according to an embodiment of invention.

FIGS. 7 and 8 describe some embodiments of the invention that may be carried out in combination with the embodiments described above, or any one of the embodiments 7 and 8 may be carried out independently. The embodiment of FIG. 7 is based on a discovery that incorrect error detection rate increases as a function of the SNR of the channel between the source device and the sink device. The incorrect error detection rate refers to that the sink device detects the transport block, CBG, or the code block to contain no errors when it actually contains errors. In other words, when the channel quality is high the rate of incorrect error detections is higher than when the channel quality is poor. The inventors have detected this phenomenon when in connection with the LDPC codes, but the same phenomenon may be associated with other channel codes as well. Embodiment of FIG. 7 addresses this issue by configuring the source device to allocate the number of error detection bits according to a value characterizing the channel quality between the source device and the sink device. In an embodiment, the value characterizes the SNR of the channel. In another embodiment, the value is associated with the channel quality or proportional to the SNR, e.g. a target block error rate (BLER) determined on the basis of the channel quality or a target SNR or a target signal-to-interference-plus-noise ratio (SINR). The block error rate may refer to the error rate of code blocks. In other embodiments, the block error rate may refer to the error rate of transport blocks or CBGs.

Referring to FIG. 7, the source device or an apparatus suitable for the source device determines the value proportional to the SNR in block 700, e.g. the BLER. In block 702, the value determined in block 700 is used to select the number of error detection bits for at least one of the transport block, CBGs of the transport block, and code blocks of the transport block. Note that this embodiment is applicable to even the conventional solution described above, wherein the error detection bits are appended only to the transport block and to the code blocks of the transport block. With the embodiment of FIG. 7, the source device is capable of compensating the incorrect error detection rate in high-quality channels. Block 702 may be based on using a mapping table linking the values proportional to the channel quality (e.g. the SNR) to the number of error detection bits. In an embodiment where the value represents the BLER, the mapping table has the following form:

TABLE 1

| BLER | Number of additional CRC bits |
|------|-------------------------------|
| 10% | 10 |
| 1% | 11 |
| 0.1% | 12 |
| 0.01% | 14 |

In Table 1, the number of additional bits may refer to that there is a fixed minimum number of error detection bits appended to the transport block, CBGs, and/or code blocks, and the value of Table 1 indicates the number of additional bits to be appended in addition to the minimum number of error detection bits. In an embodiment, the number of error detection bits is static and defined by the target BLER of the transmission. In another embodiment, the number of error detection bits is semi-static or dynamic. For example, the number of error detection bits may be changed per user depending on quality-of-service requirements.

The sink device may also execute the process of FIG. 7 in order to determine the number of error detection bits in the code block, CBG, and/or transport block. The source device and the sink device may exchange one or more messages regarding channel quality so that devices have a common understanding of the value in block 700.

Figure 9:
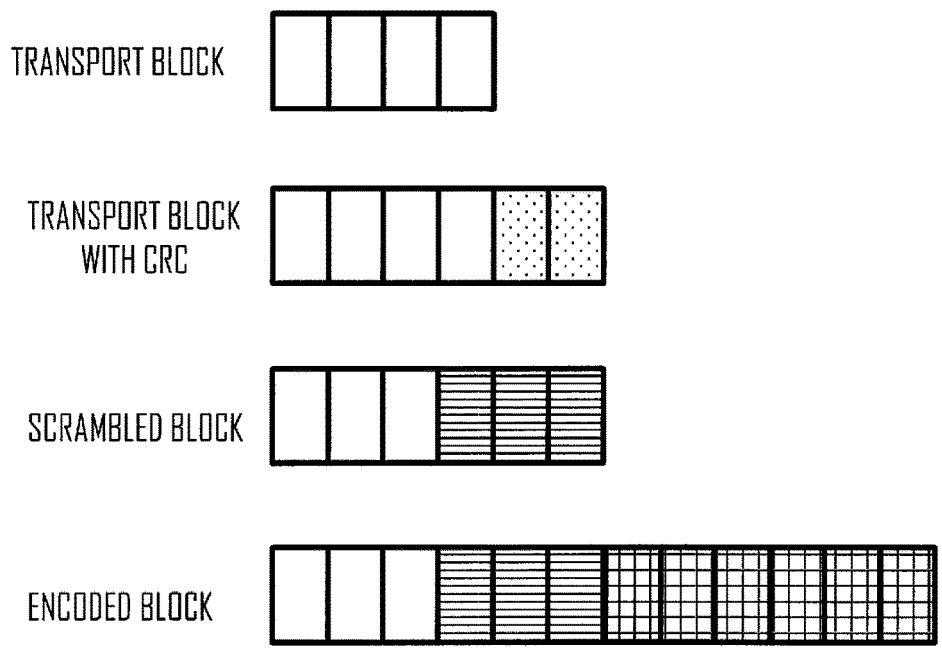

FIG. 8 illustrates an embodiment where the source device uses a variable number of error detection bits and a scrambling code of a fixed length. For example, the scrambling code may be formed by using a network identifier of the source device, such as a radio network temporary identifier (RNTI) of an LTE system. Referring to FIG. 8, the process may comprise in the source device or an apparatus suitable for the source device: generating a transport block and error detection bits for the transport block, wherein the number of error detection bits is unequal to M (block 200). In FIG. 9, the transport block is illustrated by non-textured rectangles, and the error detection bits are illustrated with dotted filling. In block 800, the source device scrambles last M bits of the so generated block comprising the transport block and the error detection bits, thus forming a scrambled block. M may be fixed and represent the length of the scrambling code. The scrambled part of the block is illustrated in FIG. 9 by horizontal lining. In this example, the error detection bits become scrambled and, additionally, a portion of the transport block. In block 802, the scrambled block is encoded in a channel encoder such as an LDPC encoder. The output of the channel encoder is an encoded block comprising the scrambled block as a systematic part and parity bits illustrated by hash texture in FIG. 9. Thereafter, the encoded block may be output for modulation and further transmission signal processing in a radio transmitter. The sink device performs a reverse operation: after decoding a received encoded block, the resulting decoded and scrambled block is descrambled by applying the scrambling code of length M to the M last bits of the decoded scrambled block. As a result, the transport block with the error detection bits is acquired, and this block may be subjected to the error detection in the above-described manner.

In an embodiment, the scrambling in the source device of the error detection bits is carried out after the encoding. Similarly, the descrambling may be carried out before the decoding in the sink device.

Figure 10:
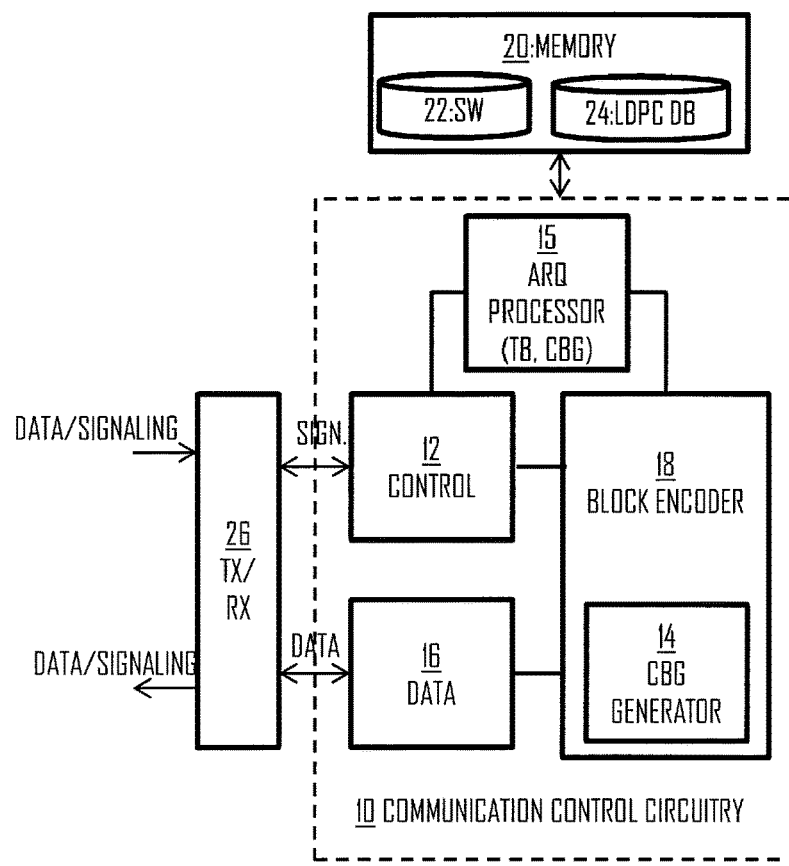
FIGS. 10 and 11 illustrate block diagrams of apparatuses according to some embodiments of the invention.
Figure 11:
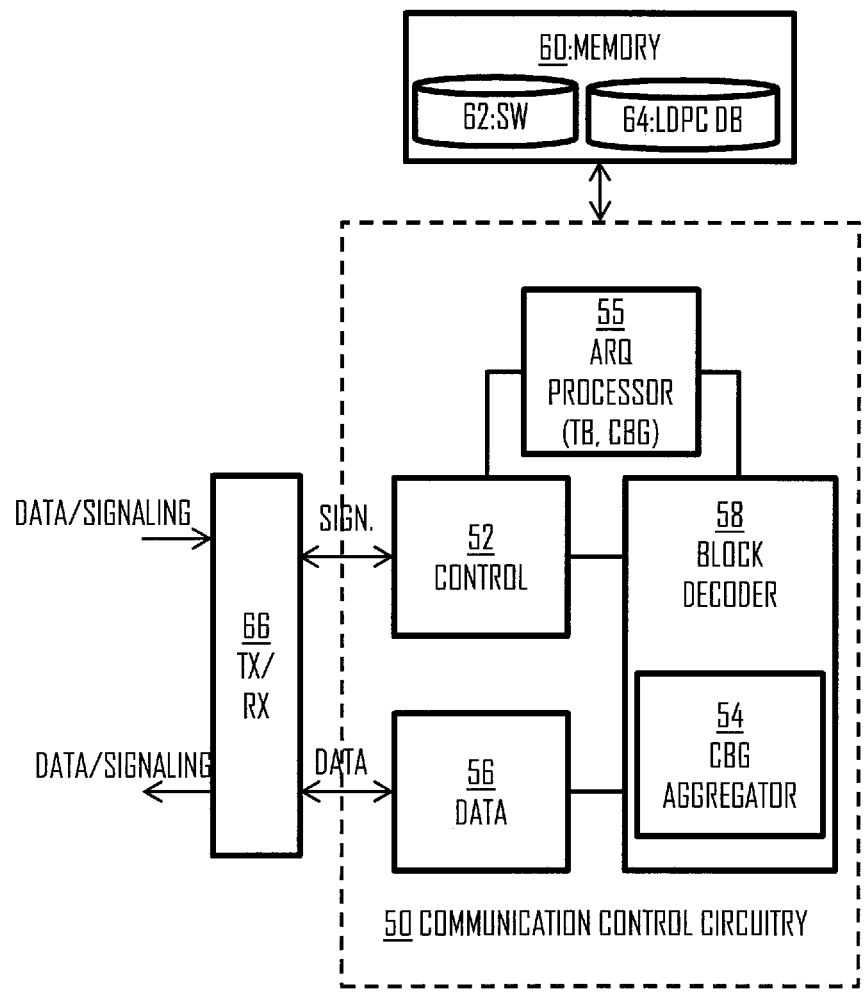

FIGS. 10 and 11 illustrate block diagrams of apparatuses according to some embodiments of the invention. FIG. 10 illustrates the source device comprising an encoder and FIG. 11 illustrates the sink device comprising a decoder. It should be appreciated that in many implementations an apparatus comprises both the encoder and the decoder so the apparatus may be considered as a combination of the embodiments of FIGS. 10 and 11. Since the description of embodiments in this document uses the viewpoint of the source device and the sink device, the same form of description is maintained with FIGS. 10 and 11. The apparatus of FIGS. 10 and/or 11 may be any one of the above-described apparatuses, e.g. the access node 110 or a terminal device 120 or a peer device 122, or the apparatus may be comprised in any one of the above-described apparatuses 110, 120, 122. The apparatus may be, for example, a circuitry or a chipset in any one of the apparatuses 110, 120, 122. The apparatus may be an electronic device comprising electronic circuitries.

Referring to FIG. 10, the apparatus may comprise a communication control circuitry 10 such as at least one processor, and at least one memory 20 including a computer program code (software) 22 wherein the at least one memory and the computer program code (software) are configured, with the at least one processor, to cause the apparatus to carry out any one of the embodiments of the transmitter described above.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for the encoder 402. For example, the configuration database 24 may store information on the number of CBGs to be generated for each sink device to which the apparatus transmits transport blocks. The configuration database may also store information on ARQ processes in the source device, e.g. information on transport blocks transmitted to a sink device but not yet positively acknowledged with an ACK.

The apparatus may further comprise a communication interface (TX/RX) 26 comprising hardware and/or software for realizing communication connectivity according to one or more communication protocols. The communication interface 26 may provide the apparatus with communication capabilities to communicate in the cellular communication system and/or in another wireless network. Depending on whether the apparatus is configured to operate as a terminal device, a peer device, or an access node, and depending on a radio access technology, the communication interface may provide different functions. The communication interface 26 may comprise standard well-known components such as an amplifier, filter, frequency-converter, (de)modulator, and encoder/decoder circuitries and one or more antennas. The communication interface 26 may comprise radio interface components providing the apparatus with radio communication capability in one or more wireless networks and enable radio communication with one or more sink devices.

Referring to FIG. 10, the communication control circuitry 10 may comprise a transmission controller 12 configured to carry out control plane signalling such as transmission and reception of control or management messages. Such messages may include link establishment messages, link management messages, link termination messages, handover messages, measurement messages, beacon or pilot signals, etc. The communication control circuitry 10 may further comprise a data communication circuitry 16 configured to carry out user plane or data plane communication with the terminal devices.

The communication control circuitry 10 may further comprise a block encoder 18 configured to encode control plane and/or data plane messages before transmission through the communication interface 26. The block encoder 18 may perform channel encoding by employing LDPC channel codes, for example. The block encoder may comprise a CBG generator 14 configured to process a transport block before the encoding, e.g. by performing blocks 200 to 204. The CBG generator 14 may be configured to form CBGs from the transport block by using the information on the number of CBGs to form stored in the configuration database 24, and to attach error detection bits to each CBG. Then, the CBG generator may form the code blocks from each CBG, and output the code blocks to a channel encoder for encoding.

The communication control circuitry 10 may further comprise an ARQ processor 15 configured to track and manage the above-described ARQ process(es) of transport blocks and/or CBGs and associated retransmissions. In connection with transmission of a transport block and/or CBG, the ARQ processor 15 may store an identifier of the transport block and/or the CBG to record that the transport block and/or the CBG is being transferred to the sink device. Upon receiving an ACK for the transport block and/or the CBG through the transmission controller 12, the ARQ processor may terminate the ARQ process of the transport block and/or the CBG. Upon receiving a NAK for the transport block and/or the CBG from a sink device through the transmission controller 12, the ARQ processor may perform a retransmission of the transport block and/or CBG indicated to be erroneously received by the sink device.

In an embodiment, the communication control circuitry 10 further comprises an adaptive error detection bit selection circuitry configured to carry out the process of FIG. 7.

In an embodiment, the communication control circuitry 10 further comprises an adaptive scrambling circuitry configured to adapt the scrambling to variable numbers of error detection bits, as described above in connection with FIGS. 8 and 9.

In an embodiment, the apparatus of FIG. 10 comprises at least one processor 10 and at least one memory 20 including a computer program code 22, wherein the at least one memory and the computer program code are configured, with the at least one processor, to cause the apparatus to carry out the functionalities of the source device according to any one of the embodiments of FIGS. 2, 5A, and 6 to 8. According to an aspect, when the at least one processor 10 executes the computer program code, the computer program code causes the apparatus to carry out the functionalities according to any one of the embodiments of FIGS. 2, 5A, and 6 to 8. According to another embodiment, the apparatus comprises the at least one processor 10 and at least one memory 20 including a computer program code 22, wherein the at least one processor 10 and the computer program code 22 perform the at least some of the functionalities of the source device according to any one of the embodiments of FIGS. 2, 5A, and 6 to 8. Accordingly, the at least one processor, the memory, and the computer program code form processing means for carrying out embodiments of the present invention in the source device. According to yet another embodiment, the apparatus carrying out the embodiments of the invention in the source device comprises a circuitry including at least one processor 10 and at least one memory 20 including computer program code 22. When activated, the circuitry causes the apparatus to perform the at least some of the functionalities of the source device according to any one of the embodiments of FIGS. 2, 5A, and 6 to 8.

Referring to FIG. 11, the apparatus may comprise a communication control circuitry 50 such as at least one processor, and at least one memory 60 including a computer program code (software) 62 wherein the at least one memory and the computer program code (software) are configured, with the at least one processor, to cause the apparatus to carry out any one of the embodiments of the sink device described above.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing configuration data for the encoder 402. For example, the configuration database 64 may store information on the number of code blocks to be aggregated into one CBG. The configuration database may also store information on ARQ processes in the sink device, e.g. information on transport blocks not yet correctly received in the sink device.

The apparatus may further comprise a communication interface (TX/RX) 66 comprising hardware and/or software for realizing communication connectivity according to one or more communication protocols. The communication interface 66 may provide the apparatus with communication capabilities to communicate in the cellular communication system and/or in another wireless network. Depending on whether the apparatus is configured to operate as a terminal device, a peer device, or an access node, and depending on a radio access technology, the communication interface may provide different functions. The communication interface 66 may comprise standard well-known components such as an amplifier, filter, frequency-converter, (de)modulator, and encoder/decoder circuitries and one or more antennas. The communication interface 26 may comprise radio interface components providing the apparatus with radio communication capability in one or more wireless networks and with one or more source devices.

Referring to FIG. 11, the communication control circuitry 50 may comprise a transmission controller 52 configured to carry out control plane signalling such as transmission and reception of control or management messages. Such messages may include link establishment messages, link management messages, link termination messages, handover messages, measurement messages, beacon or pilot signals, etc. The communication control circuitry 50 may further comprise a data communication circuitry 56 configured to carry out user plane or data plane communication with the terminal devices.

The communication control circuitry 50 may further comprise a block decoder 58 configured to decode control plane and/or data plane messages received through the communication interface 66. The block decoder 58 may perform channel decoding by employing LDPC channel codes, for example. The block decoder may comprise a CBG aggregator 54 configured to arrange received code blocks into parallel pipelines for decoding and error detection, e.g. by performing blocks 300 to 302. After decoding, the decoded code blocks may be aggregated by the CBG aggregator into a CBG and subjected to error detection on the CBG level, as described above.

The communication control circuitry 50 may further comprise an ARQ processor 55 configured to track and manage the above-described ARQ process(es) of transport blocks and/or CBGs and associated retransmissions in the sink device. As the ARQ processor 15 of the source device, the ARQ processor 55 may perform the ARQ processes on at least one or more of the following levels: transport block level, CBG level, and the code block level. Upon detecting residual, post-decoding errors in a code block, CBG, or the transport block, the ARQ processor 15 may generate a NAK message and transmit the NAK message to the source device to trigger retransmission. Upon detecting no residual, post-decoding errors in a code block, CBG, or the transport block, the ARQ processor 15 may generate an ACK message and transmit the ACK message to the source device to end the corresponding ARQ process.

In an embodiment, the communication control circuitry 50 further comprises an adaptive error detection bit selection circuitry configured to carry out the process of FIG. 7.

In an embodiment, the communication control circuitry 50 further comprises an adaptive scrambling circuitry configured to adapt the scrambling to variable numbers of error detection bits, as described above in connection with FIGS. 8 and 9.

In an embodiment, the apparatus of FIG. 11 comprises at least one processor 50 and at least one memory 60 including a computer program code 62, wherein the at least one memory and the computer program code are configured, with the at least one processor, to cause the apparatus to carry out the functionalities of the sink device according to any one of the embodiments of FIGS. 3 and 5A to 9. According to an aspect, when the at least one processor 50 executes the computer program code, the computer program code causes the apparatus to carry out the functionalities according to any one of the embodiments of FIGS. 3 and 5A to 9. According to another embodiment, the apparatus comprises the at least one processor 50 and at least one memory 60 including a computer program code 62, wherein the at least one processor 50 and the computer program code 62 perform the at least some of the functionalities of the sink device according to any one of the embodiments of FIGS. 3 and 5A to 9. Accordingly, the at least one processor, the memory, and the computer program code form processing means for carrying out embodiments of the present invention in the sink device. According to yet another embodiment, the apparatus carrying out the embodiments of the invention in the sink device comprises a circuitry including at least one processor 50 and at least one memory 60 including computer program code 62. When activated, the circuitry causes the apparatus to perform the at least some of the functionalities of the sink device according to any one of the embodiments of FIGS. 3 and 5A to 9.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways, e.g. applied in connection with other channel codes than the LDPC codes. Further, it is clear to a person skilled in the art that the described embodiments may, but are not required to, be combined with other embodiments in various ways.

What is claimed is:

1. A method comprising:
generating, by a first apparatus, a transport block and error detection bits for the transport block;
generating, by the first apparatus, a first number of code block groups by using the transport block and the error detection bits, wherein the first number is two or higher and based on a number of code blocks a second apparatus is able to decode in parallel processing;
generating, by the first apparatus, error detection bits for at least one of the code block groups;
generating, by the first apparatus, a plurality of code blocks for each code block group; and
causing transmission of the plurality of code blocks to the second apparatus.

2. The method of claim 1, further comprising before said generating the transport block: receiving, by the first apparatus from the second apparatus, a message indicating the number of code blocks that can be decoded in parallel in the second apparatus.

3. The method of claim 1, further comprising performing, by the first apparatus, an automatic repeat request process on a code block group level.

4. The method of claim 3, wherein said performing comprises:
receiving, in the first apparatus from the second apparatus, a feedback message indicating erroneous reception of a code block group identified in the feedback message; and
retransmitting, by the first apparatus in response to the feedback message, the code block group to the second apparatus.

5. A method comprising:
receiving, in a first apparatus from a second apparatus, a plurality of code blocks of a transport block;
forming by the first apparatus a first number of code block groups by using the plurality of code blocks, wherein the first number is two or higher and based on a number of code blocks the first apparatus is able to decode in parallel processing;
decoding, by the first apparatus, code blocks of a code block group in said parallel processing;
performing, by the first apparatus after said decoding, error detection of the code block group by using error detection bits associated with the code block group;
upon detecting an error in the code block group in said error detection, causing transmission of a feedback message indicating erroneous reception of the code block group to the second apparatus and receiving, as a response to the feedback message, a retransmission of the code block group from the second apparatus;
upon detecting no errors in the code block group in said error detection, performing said decoding and said performing the error detection for a subsequent code block group of the transport block;
upon detecting no error in the first number of code block groups in said error detecting, aggregating the code block groups into a transport block; and
performing error detection by using error detection bits associated with the transport block.

6. The method of claim 5, further comprising before said receiving the transport block: transmitting, by the first apparatus to the second apparatus, a message indicating the number of code blocks that can be decoded in parallel in the first apparatus.

7. The method of claim 5, further comprising performing, by the first apparatus, an automatic repeat request process on a code block group level.

8. The method of claim 7, further comprising performing, by the first apparatus, a second automatic repeat request process based on said performing error detection by using the error detection bits associated with the transport block.

9. The method of claim 1, wherein the error detection bits comprise cyclic redundancy check bits.

10. An apparatus comprising:
at least one processor, and
at least one non-transitory memory comprising a computer program code, wherein the processor, the memory, and the computer program code are configured to cause the apparatus to:
generate a transport block and error detection bits for the transport block;
generate a first number of code block groups by using the transport block and the error detection bits, wherein the first number is two or higher and based on a number of code blocks another apparatus is able to decode in parallel processing;
generate error detection bits for at least one of the code block groups;
generate a plurality of code blocks for each code block group; and
cause transmission of the plurality of code blocks to the other apparatus.

11. The apparatus of claim 10, wherein the processor, the memory, and the computer program code are configured to cause the apparatus to receive from the other apparatus, before generating the transport block, a message indicating the number of code blocks that can be decoded in parallel in the other apparatus.

12. The apparatus of claim 10, wherein the processor, the memory, and the computer program code are configured to cause the apparatus to perform an automatic repeat request process on a code block group level.

13. The apparatus of claim 12, wherein the processor, the memory, and the computer program code are configured to cause the apparatus to carry out the automatic repeat request process on the code block group level by performing at least the following:
receive, from the other apparatus, a feedback message indicating erroneous reception of a code block group identified in the feedback message; and
retransmit, in response to the feedback message, the code block group to the other apparatus.

14. The apparatus of claim 13, wherein the feedback message comprises an acknowledgment for a plurality of code block groups of a transport block.

15. The apparatus of claim 12, wherein the processor, the memory, and the computer program code are configured to cause the apparatus to perform a second automatic repeat request process on a transport block level.

16. A apparatus comprising:
at least one processor, and
at least one non-transitory memory comprising a computer program code, wherein the processor, the memory, and the computer program code are configured to cause the apparatus to:
receive, from another apparatus, a plurality of code blocks of a transport block;
form a first number of code block groups by using the plurality of code blocks, wherein the first number is two or higher and based on a number of code blocks the apparatus is able to decode in parallel processing;

decode code blocks of a code block group in said parallel processing;
perform, after said decoding, error detection of the code block group by using error detection bits associated with the code block group;
upon detecting an error in the code block group in said error detection, cause transmission of a feedback message indicating erroneous reception of the code block group to the other apparatus and receive, as a response to the feedback message, a retransmission of the code block group from the other apparatus;
upon detecting no errors in the code block group in said error detection, perform said decoding and said performing the error detection for a subsequent code block group of the transport block;
upon detecting no error in the first number of code block groups in said error detecting, aggregate the code block groups into a transport block; and
perform error detection by using error detection bits associated with the transport block.

17. The apparatus of claim 16, wherein the processor, the memory, and the computer program code are configured to cause the apparatus transmit to the other apparatus, before receiving the transport block, a message indicating the number of code blocks that can be decoded in parallel in the apparatus.

18. The apparatus of claim 16, wherein the processor, the memory, and the computer program code are configured to cause the apparatus to perform an automatic repeat request process on a code block group level.

19. The apparatus of claim 18, wherein the processor, the memory, and the computer program code are configured to cause the apparatus to perform a second automatic repeat request process based on said performing error detection by using the error detection bits associated with the transport block.

20. The apparatus of claim 10, wherein error detection bits comprise cyclic redundancy check bits.

* * * * *